Dec. 29, 1964   KIYOSHI SANDOW ETAL   3,163,182
PIPE COVERING AND METHOD OF APPLYING SAME
Filed April 24, 1961
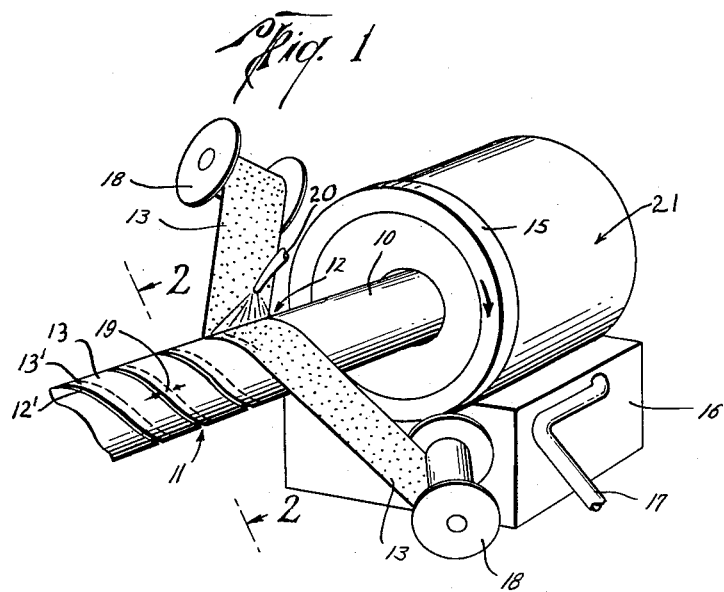
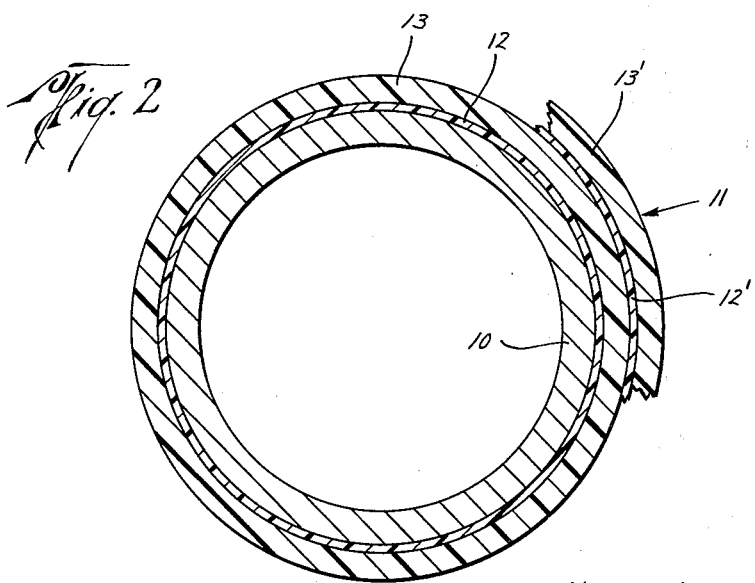
Kiyoshi Sandow
Stanton U. McGary
INVENTORS
BY Wm. E. Ford
ATTORNEY 3,163,182
PIPE COVERING AND METHOD OF
APPLYING SAME
Kiyoshi Sandow and Stanton U. McGary, Houston, Tex., assignors to Plasteco, Inc., Houston, Tex., a corporation of Texas
Filed Apr. 24, 1961, Ser. No. 105,053
9 Claims. (Cl. 138—144)

This invention relates to an improved, non-corrodible pipe covering, and to a method of applying the same to a length of pipe, this application being a continuation-in-part application of copending application Serial No. 659,237, filed May 15, 1957, now abandoned by the same applicants for Pipe Covering and Method of Applying Same.

It is an object of the invention to provide a simple, inexpensive covering capable of being applied to lengths of pipe requiring protection from the elements and particularly applicable to pipes adapted to be buried in the ground.

It is another object of the invention to provide a pipe covering and method of application whereby the pipe is protected from corrosion by covering it with a covering of high ohmic resistance for minimizing electrolytic action which otherwise would result, the covering also protecting the pipe against other physical and chemical attack resulting from soil or other contact.

It is a further object of the invention to provide such a pipe covering and method of application whereby a coating normally applied unheated is assisted in protecting the pipe against corrosion by the application thereover of a thermoplastic film normally applied unheated and preferably of a composition to resist chemicals, fungi, oils, water, and physical reaction with the soil, while at the same time it serves to provide a sealing layer over the coating.

It is also an object of this invention to provide a pipe covering and pipe covering method of this class which will protect pipe from chemical or physical reaction with water whether the pipe is above ground, underground or submerged.

It is an additional object of this invention to provide pipe covering of this class, and a method of its application to the pipe whereby the film which provides a sealing layer over the coating may preferably be of a heat repellant color.

It is still another object of this invention to provide a pipe covering of this class and a method of its application whereby a thermoplastic material such as a resinous compound and a solvent mixed together normally unheated to form a flowable coating to be applied to the pipe surface and thereafter to be wrapped over with a normally unheated thermoplastic film, the thermoplastic of the film being preferably similar to the thermoplastic of the coating, the solvent first penetrating into the film to begin relieving its inherent stress, and passing therethrough as such inherent stress is relieved, and evaporating therefrom, the coating drying as its solvent component begins departing outwardly and taking on the action of an adhesive between the film and the pipe, the film drying as the solvent evaporates therefrom and being drawn inwardly by the adhesive action of the coating as such coating loses its solvent component, and finally the continued drying of the solvent from the coating and its penetrating into and evaporation from the film resulting in the thermoplastic material, as a resinous compound, substantially stripped of solvent adhering as a cement to the pipe and drawing thereafter the film to be bonded therewith with the result of film and the substantially solvent stripped thermoplastic comprising a covering firmly fitting over the surface of the pipe and the contourage thereof to protect it from corrosion.

The foregoing, as well as other objects, will be apparent as the herein specification proceeds and is considered in connection with the accompanying drawings in which:

As a glossary for identifying the terminology herein employed the mixture of ingredients or materials applied to the pipe in advance of the film is termed the "coating" and comprises a liquid, base, or carrier agent component termed the "solvent" or "solvents," while the thermoplastic material, as a resinous compound, which is transported by the solvent or solvents, will be termed the "adhesive," the term adhesive being applied in that the transported medium has adhesive properties when it is first mixed with the solvent, although it does not exercise such properties in the stricter sense until the solvent begins drying therefrom as a web or calendered roll of wrapping material termed the "film" is applied thereover. Then as the solvent continues to leave the coating it exercises more and more adhesive properties until in the end it carries out the specialized functions of an adhesive resulting in cementing itself to the pipe and bonding the film thereto. The sustance left on the pipe after the solvent has substantially all evaporated is then termed the pipe "covering" comprised of the adhesive substantially stripped of its carrying agent or solvent and forming substantially a cement on the pipe and the film bonded thereto.

FIG. 1 is a fragmentary perspective view, partially diagrammatic, which shows a length of pipe having a protective covering applied thereto in accordance with a form of this invention; and FIG. 2 is a cross-sectional view of an exaggerated scale taken along line 2—2 of FIG. 1.

Referring to FIG. 1, a length of pipe 10 is shown having a covering 11 applied thereto which comprises a comparatively thin flowable coating 12 which may be applied as by means of a spout or spray nozzle 20, and a film 13, which may be applied by wrapping. A conventional pipe coating and wrapping machine is shown diagrammatically in FIG. 1 as being employed to wrap a film 13, and FIG. 1 also shows application of a coating 12. Machines of this type are well developed in the trade and are exemplified by machines such as those disclosed in U.S. Patent No. 2,583,819, issued January 29, 1952, to James D. Cummings.

Since such machines are so well known in the art only a diagrammatic representation is shown in FIG. 1, the pipe 10 to be covered being shown extending through such a machine 21. The machine includes a ring 15 supported for rotation about the pipe 10 by a frame 16 which is movable along the pipe by a conventional transmission, not shown.

The film 13 which wraps over the coating 12, as shown in exaggerated detail in FIG. 2, is shown being applied normally unheated or "cold" in FIG. 1 from a plurality of strips packaged on spools 18 which are supported from the ring 15 by conventional means, not shown, so that the spool axes are inclined to the axis of rotation of the ring 15. The arrangement is such that rotation of the ring 15 about the pipe 10 winds the film 13 helically or spirally about the length of the pipe 10, provision being made conventionally in such machine 21 so that the leading or forward edge or strip width of a film 13, as applied from a leading spool 18, may be overlapped by the following or rearward edge or strip width of a film 13, as applied from a following spool 18. Such provision includes means for adjustment as to degree of overlap, and the reference numeral 19 is employed in FIG. 1 to indicate the width of extent of overlap.

In such case the machine 21 may carry a pump as is done conventionally. Such a pump is not shown, but a conduit 17 is shown diagrammatically to indicate delivery by the machine 21 of the coating 12 to the spray nozzle 20 under pressure, as pump pressure. In such case the coating 12 from the conduit 17 is fed normally unheated or "cold" from a conventional reservoir which is stationary with relation to the frame 16, into the rotating ring 15 which carries the spray nozzles 20.

As an optical arrangement, a spray nozzle means may be provided which does not rotate with the ring 15, but which is stationary with relation to the frame 16, and in this case the coating 12 may be delivered from the conduit 17 under pump pressure into a reservoir which is stationary with relation to the frame 16. Under such circumstances a timed ejection means may be provided to eject the coating at intervals as each film 13 successively approaches a pre-determined pocket space area of discharge.

Another satisfactory method employed in certain large pipe processing yards would be that of rotating the pipe while feeding it forward past the film spools, which revolve about stationary axles as the forward moving pipe unwinds the film from the spools.

Under certain conditions not requiring speed in operation the coating applying means 20 may represent the spout of a container, and the coating 12 may be applied manually, and similarly the film 13 may be handwrapped over the coating on the pipe, and on the forward edge or strip width of a leading film strip which has also been handwrapped.

Regardless of what modification of equipment may be employed, so long as the coating is applied in a manner to coat the pipe in advance over the area which the leading spiral of film is to follow in enwrapping, and so long as the coating, as applied, extends amply rearwardly over the leading edge of the last applied film spiral which is to be overlapped, as the solvent departs outwardly a physical and chemical sealing bond is effected between the rear edge of a leading spiral of film, the coating, and the leading part of the immediately previously applied film spiral thereunder.

As illustrated in FIG. 1, the spray nozzles 20 are rotatable with the ring 15, and each nozzle may be supported from the ring 15 in advance of the spool 18 adjacent thereto so that it leads such spool 18 in the direction of rotation, each nozzle being so directed that it ejects coating therefrom into a pocket or deposit space which is formed by the film 13 as it extends tangentially upwardly from the pipe 10 to the spool 18, and the pipe surface adjacent thereto and upwardly of the point of film tangency therewith. As applied centrally in this deposit space, the coating is contacted by the film which in spirally moving wipes the coating onto the pipe immediately in advance thereof, and onto the forward edge or underlap strip of the film of the wrapped spiral immediately to the rear thereof. By this manner of application, the coating is spread by the film before it may have time to run out of said space either forwardly or rearwardly, and a positive, and substantially uniform application may be achieved.

FIG. 2 shows a cross-sectional view of the pipe 10 to which has just been applied the coating 12 and over which has been wrapped the film 13. The section of FIG. 2 has been taken transversely to the longitudinal axis of the pipe so that the overlapped area is cut by such cross-section, with the result that the coating 12', as applied to the area of overlap 19, shown in FIG. 1, is indicated in this FIG. 2 which also shows the film 13' which overlaps the coating 12'.

Obviously when the coating 12' is of substantially the same constituency as the film layers 13 and 13' on either side thereof, the coating 12' as shown in this figure would eventually lose its identity as its solvent components pass away from it, and the film layers 13, 13' would appear as a homogeneous wrapping.

The inveniton is not limited to any particular type of coating or film and as above stated, the coating may include asphalt or cold tar products and material other than thermoplastics such as resinous compounds may comprise the transported components of coatings, also the types of film normally employed unheated to overwrap the coating is not limited. However, in practice, thermoplastics of vinyl types have been found to comprise one of the most excellent adhesive components of coatings, and of these vinyl types polyvinyls, polyvinylidene chloride resins, and polyethylene are applicable. Also thermoplastic acetates such as cellulose acetate may be employed. Any of these above enumerated adhesive components of coatings may serve in a flowable coating compound if a solvent is applied thereto, and a variety of solvents may serve with such adhesives to provide such a desired flowable coating, acetone, methylene chloride, methyl iso butyl ketone, methyl ethyl ketone, and ethylene chloride being among those most applicable, such solvents including ingredients such as toluol and/or benzol mixed therewith as diluents.

Although various films may be used, it has been found that the film 13 may best be of the same or similar types of thermoplastics as those best employed as the adhesive components of coatings, namely thermoplastics of polymerized vinyl resins, as polyvinyls, polyvinyl chloride, also polyethylene, and also thermoplastics such as cellulose acetates. These materials, packaged in the form of rolls of films, are generally substantially thicker than the coating 12, even when it is first applied.

Prior to its application the film has in processing acquired strength, consistency, and continuity, and thus must have some substantial thickness to carry out its function, whereas the flowable coating need only have enough consistency to thinly, but completely cover the pipe surface.

Then, as the film absorbs or is penetrated by the solvent from the coating it is at least in part relieved of the inherent stress it has acquired in the process of making it with the result that it is softened by such absorption or penetration of solvent thereinto so that its physical strength is lessened so that it is enabled to follow the adhesiveness of the coating as the coating diminishes in thickness as the solvent departs therefrom into the film to evaporate outwardly from the film. The coating, as it loses solvent, adheses intimately to the contourage of the pipe including any pitted surfaces therein, and by virtue of its adhesiveness it pulls the film thereafter on top of the drying adhesive of the coating. Then as drying continues as more and more of the solvent passes outwardly from the coating and through the film, the coating, which now comes to include substantially the adhesive component thereof from which the solvent has substantially departed, becomes substantially cemented to the pipe, and the film, as the solvent which has penetrated thereinto evaporates outwardly therefrom, becomes bonded in intimate degree to the remaining component of the coating, including a double bond at the overlaps consisting of a remaining adhesive component substantially cemented to the pipe, a film layer substantially bonded thereto, an outer remaining adhesive layer to which the under adhesive layer is substantially bonded, and an outer film layer which is substantially bonded to the outer remaining adhesive layer. The film, by virtue of its character as a thermoplastic, preferably as a thermoplastic resin, constitutes one of the most effective mediums the trade has been able to find to combat corrosion and electrolytic effects of related nature. If an oxide, as titanium oxide, is added to the film in processing, a white or light color results so that it deflects heat, also a fungicide may be added to inhibit bacteria.

In practice it has been found that a solvent, as methyl ethyl ketone, mixed with a polyvinyl resin, as a polyvinylidene chloride resin, will make a readily flowable coating which may be easily applied to the pipe. The same facts apply in regard to polyethylene and cellulose acetate. When such is wrapped with a polyvinyl film, in the form of a calendered roll, there is a complete bonding between the leading film spiral and the pipe and also the forward part of the trailing spiral and the overlapping rear part of the leading spiral are homogeneously bonded. As tested, the ohmic resistance of the covering and pipe has been found to be greatly increased by this process with a resultant substantial increase in resistance to electrolytic action, a major cause of corrosion.

In the employment of this invention there is eliminated the necessity for heating the coating, as is required in U.S. Patent No. 2,713,383, issued July 19, 1955, to Ted Kennedy, where the coating consists of a molten wax, and the success of this invention includes to a great degree the employment of an enwrapping film, which may react with a wide range of coatings. As to the coating, any coating best serves from which a solvent may penetrate the film to relieve the inherent stress therein, and cause it to follow the adhesiveness of the coating as the coating diminishes in thickness by virtue of the substantial departure of the solvent component therefrom, and substantially cements itself to the pipe and outwardly substantially bonds itself to the film.

Hence the invention is not limited to the exact pipe coatings and films hereinabove described, nor to the exact method of application, but other coatings and films are considered as well as such may fall within the broad spirit of the invention, and within the broad scope of interpretation claimed and merited by the appended claims.

What is claimed is:

1. The method of protecting metallic pipe which comprises applying a coating to the pipe, the coating comprising an adhesive and a film solvent and being substantially devoid of metallic content, and wrapping over the coating a strip of pre-stressed, thermoplastic resin film which is very slow burning, such film as wrapped, being at substantially atmospheric temperatures within the ordinary range of encountered temperatures and being wrapped in a manner that adjacent wraps overlap, such coating also being applied to the margin of the wrap which is to be overwrapped, whereby the solvent penetrates and softens the film and thereafter evaporates and the softened film moves into the space vacated by the evaporated solvent and the adhesive adheres to the pipe and coheres with the film, and whereby the solvent from the coating on the overwrapped film margin penetrates and softens the overwrapping film margin and thereafter evaporates and the softened overwrapping film margin moves into the space vacated by the evaporated solvent from the overwrapped film margin and the adhesive between such overwrapping and overwrapped margins coheres with both margins to bond said margins together.

2. A method of protecting pipe as claimed in claim 1 in which the film employed is polyvinyl chloride.

3. A method of protecting pipe as claimed in claim 1 in which the adhesive component of the coating is selected in the form of a thermoplastic from the group of thermoplastic resins consisting of polyvinyl chloride, polyvinylidene chloride, and polyethylene.

4. The method of protecting metallic pipe which comprises applying a coating to the pipe, the coating comprising an adhesive and a film solvent and being substantially devoid of metallic content, and wrapping a strip of self-extinguishing, pre-stressed, thermoplastic resin film over the coating, such film, as wrapped, being at substantially atmospheric temperatures within the ordinary range of encountered temperatures and being wrapped in a manner that adjacent wraps overlap, such coating also being applied to the margin of the wrap which is to be overwrapped, whereby the solvent penetrates and softens the film and thereafter evaporates and the softened film moves into the space vacated by the evaporated solvent and the adhesive adheres to the pipe and coheres with the film, and whereby the solvent from the coating on the overwrapped film margin penetrates and softens the overwrapping film margin and thereafter evaporates and the softened overwrapping film margin moves into the space vacated by the evaporated solvent from the overwrapped film margin and the adhesive between such overwrapping and overwrapped margins coheres with both margins to bond said margins together.

5. A method of protecting pipe as claimed in claim 4 in which the thermoplastic resin film is selected in the form of a rolled sheet of polyvinylidene chloride which is unrolled as the film is applied.

6. In combination with a pipe, a covering upon the outer surface thereof comprising a coating upon the pipe substantially devoid of metallic content and including a thermoplastic adhesive, said covering also comprising a thermoplastic resin film which is very slow burning, said film covering said adhesive and said pipe in substantially abutting wraps with there being overwrapping and overwrapped margins of film adjacent the line of substantial abutment, said adhesive adhering to the pipe and cohering with the film to cement the film to the pipe, said adhesive also being interposed between the overwrapping and overwrapped margins of the film and cohering with said margins to bond said margins together.

7. The combination as claimed in claim 6 in which said film is polyvinyl chloride.

8. In combination with a pipe, a covering upon the outer surface thereof comprising a coating upon the pipe substantially devoid of metallic content and including a thermoplastic adhesive, said covering also comprising a self-extinguishing thermoplastic resin film covering said adhesive and said pipe in substantially abutting wraps with there being overwrapping and overwrapped margins of film adjacent the line of substantial abutment, said adhesive adhering to the pipe and cohering with the film to cement the film to the pipe, said adhesive also being interposed between the overwrapping and overwrapped margins of the film and cohering with said margins to bond said margins together.

9. The combination as claimed in claim 8 in which said film is comprised of polyvinylidene chloride.

References Cited by the Examiner

UNITED STATES PATENTS

| | | | |
|---|---|---|---|
| 1,985,997 | 1/35 | Keeran | 138—150 X |
| 2,027,704 | 1/36 | Rosener | 156—392 |
| 2,161,036 | 1/39 | Gremmel et al. | 156—187 |
| 2,713,383 | 7/55 | Kennedy | 138—150 X |
| 2,748,805 | 6/56 | Winstead | 138—144 |
| 2,828,798 | 4/58 | Hopkins et al. | 156—187 |
| 2,937,665 | 5/60 | Kennedy | 156—187 X |
| 3,018,800 | 1/62 | Hanssens | 138—125 |

EDWARD V. BENHAM, *Primary Examiner.*

LEWIS J. LENNY, *Examiner.*